(12) United States Patent
Imahara et al.

(10) Patent No.: US 9,445,164 B2
(45) Date of Patent: Sep. 13, 2016

(54) EXISTENT PERSON COUNT ESTIMATION APPARATUS

(75) Inventors: Shuichiro Imahara, Kawasaki (JP);
Kazuto Kubota, Kawasaki (JP);
Toshimitsu Kumazawa, Kawasaki (JP);
Yoshiyuki Hondo, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 774 days.

(21) Appl. No.: 13/410,332

(22) Filed: Mar. 2, 2012

(65) Prior Publication Data

US 2012/0209567 A1   Aug. 16, 2012

Related U.S. Application Data

(63) Continuation of application No. PCT/JP2009/065432, filed on Sep. 3, 2009.

(51) Int. Cl.
| G06F 17/18 | (2006.01) |
| H04Q 9/00 | (2006.01) |
| F24F 11/00 | (2006.01) |

(52) U.S. Cl.
CPC ............... *H04Q 9/00* (2013.01); *F24F 11/006* (2013.01); *F24F 11/0034* (2013.01); *H04Q 2209/43* (2013.01); *H04Q 2209/823* (2013.01); *H04Q 2209/845* (2013.01)

(58) Field of Classification Search
CPC .............. F24F 11/006; F24F 11/0034; H04Q 2209/43; G06Q 10/087
USPC ........................................................ 702/181
See application file for complete search history.

(56) References Cited

U.S. PATENT DOCUMENTS

| 2007/0003141 A1* | 1/2007 | Rittscher et al. ............. 382/181 |
| 2007/0031005 A1* | 2/2007 | Paragios et al. ............. 382/103 |
| 2009/0196206 A1* | 8/2009 | Weaver et al. ............... 370/310 |

(Continued)

FOREIGN PATENT DOCUMENTS

| JP | 9-048565 A | 2/1997 |
| JP | 2000-035243 A | 2/2000 |

(Continued)

OTHER PUBLICATIONS

Dodier et. al, "Building Occupancy Detection Through Sensor Belief Networks", 2006, Energy and Buildings, vol. 38 p. 1033-1043.*

(Continued)

*Primary Examiner* — Mischita Henson
*Assistant Examiner* — Stephanie Bloss
(74) *Attorney, Agent, or Firm* — Ohlandt, Greeley, Ruggiero & Perle, L.L.P.

(57) ABSTRACT

According to one embodiment, an existent person count estimation apparatus includes motion sensors and following units. The collection unit generates human sensing information. The instance prediction unit predicts second instances from the first instances by using the transition matrix. The likelihood calculation unit calculates likelihoods of the second instances using the time information items. The instance selection unit selects one or more third instances having likelihoods higher than a threshold. The output unit generates output information including estimate values of existent person counts for the first areas included in the third instances.

5 Claims, 14 Drawing Sheets

(56) References Cited

U.S. PATENT DOCUMENTS

2009/0201190 A1* 8/2009 Huthoefer et al. ............. 342/27
2010/0250481 A1* 9/2010 Tomastik ....................... 706/52

FOREIGN PATENT DOCUMENTS

| JP | 2008-077361 A | 4/2008 |
| JP | 2008-217351 A | 9/2008 |
| JP | 2008-298353 A | 12/2008 |
| JP | 2010-237890 A | 10/2010 |

OTHER PUBLICATIONS

English translation of IPRP dated Apr. 19, 2012 from PCT/JP2009/065432; 6 pages.
International Search Report dated Oct. 6, 2009 from PCT/JP2009/065432.

* cited by examiner

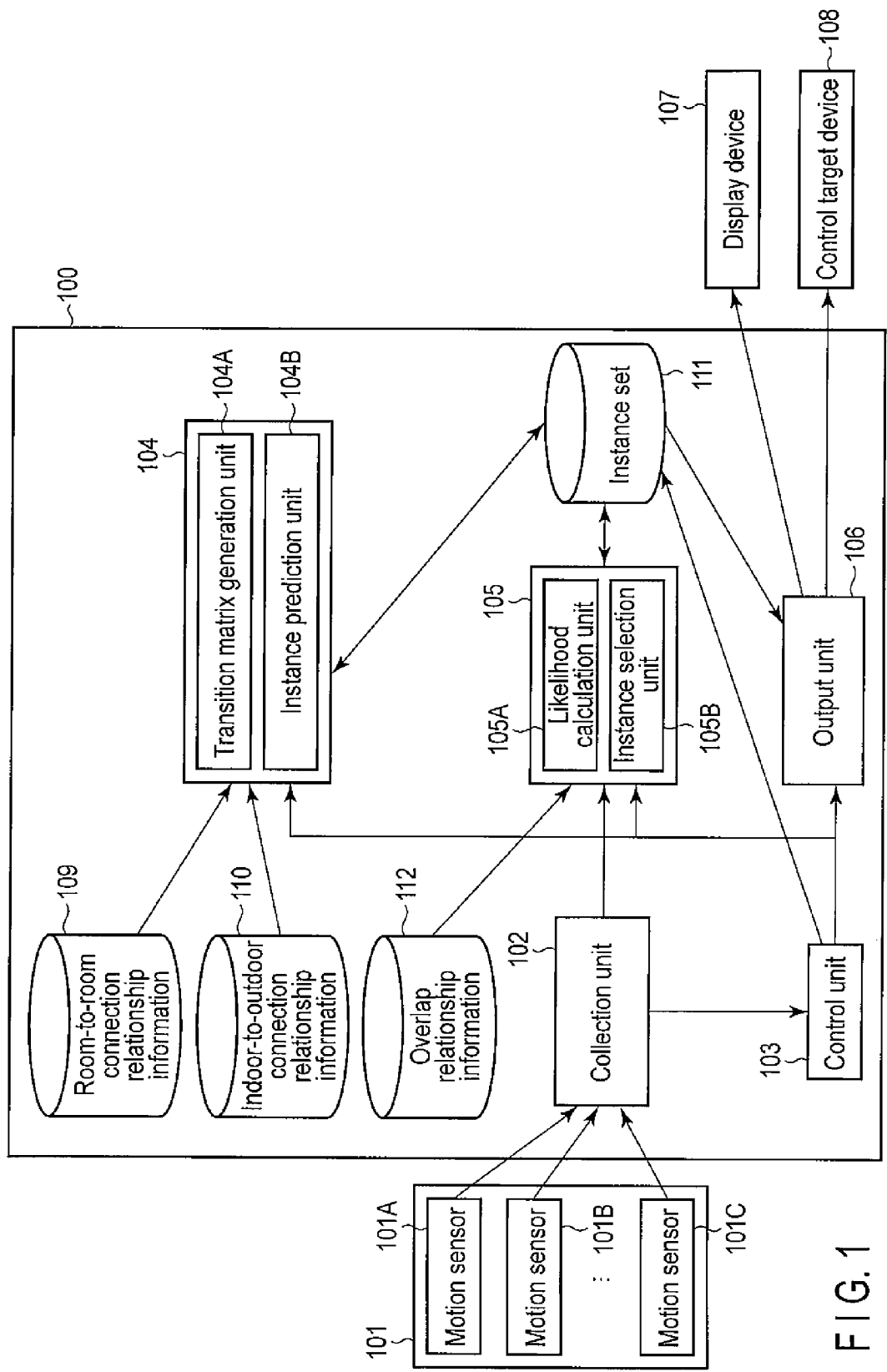
F I G. 1

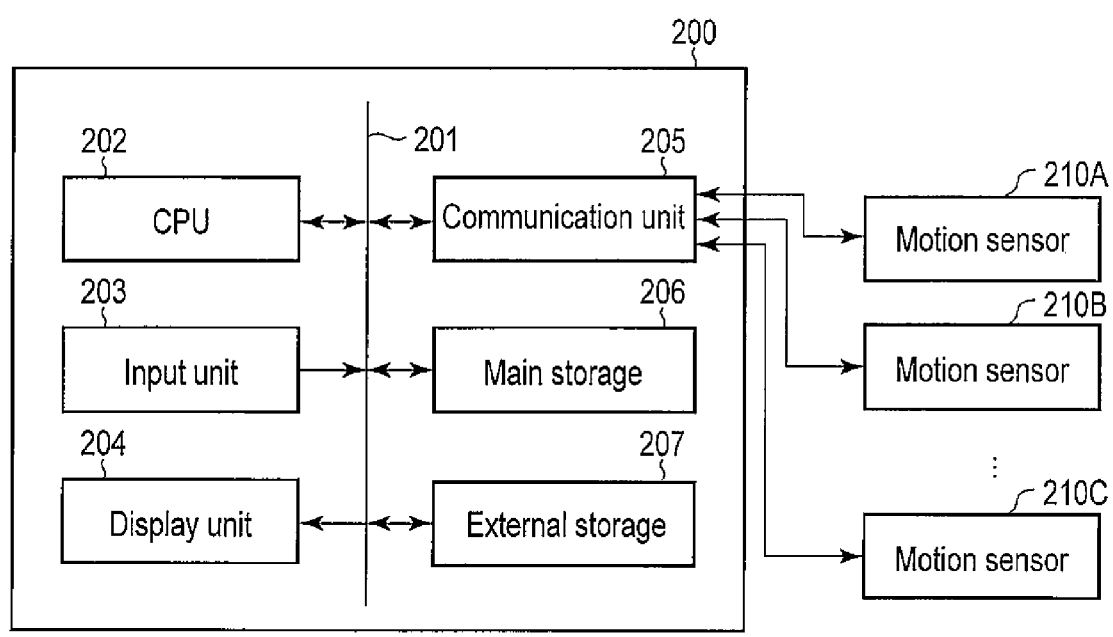
F I G. 2

|         | Room A | Room B | Room C | Room G | Room D | Room E | Room F |
|---------|--------|--------|--------|--------|--------|--------|--------|
| Room A  | 1      | 1      | 0      | 0      | 0      | 0      | 0      |
| Room B  | 1      | 1      | 1      | 0      | 0      | 1      | 0      |
| Room C  | 0      | 1      | 1      | 1      | 1      | 0      | 0      |
| Room G  | 0      | 0      | 1      | 1      | 1      | 0      | 0      |
| Room D  | 0      | 0      | 1      | 1      | 1      | 0      | 0      |
| Room E  | 0      | 1      | 0      | 0      | 0      | 1      | 1      |
| Room F  | 0      | 0      | 0      | 0      | 0      | 1      | 1      |

FIG. 4

| Room A | 1 |
|--------|---|
| Room B | 0 |
| Room C | 0 |
| Room G | 0 |
| Room D | 0 |
| Room E | 0 |
| Room F | 0 |

FIG. 5

|  | Room A | Room B | Room C | Room G | Room D | Room E | Room F |
|---|---|---|---|---|---|---|---|
| Room A | 1 | 0 | 0 | 0 | 0 | 0 | 0 |
| Room B | 0 | 1 | 0 | 0 | 0 | 0 | 0 |
| Room C | 0 | 0 | 1 | 1 | 0 | 0 | 0 |
| Room G | 0 | 0 | 1 | 0 | 1 | 0 | 0 |
| Room D | 0 | 0 | 0 | 1 | 1 | 0 | 0 |
| Room E | 0 | 0 | 0 | 0 | 0 | 1 | 0 |
| Room F | 0 | 0 | 0 | 0 | 0 | 0 | 0 |

FIG. 6

|  | Room A | Room B | Room C | Room G | Room D | Room E | Room F | Room X |
|---|---|---|---|---|---|---|---|---|
| Room A | 0.89 | 0.10 | 0 | 0 | 0 | 0 | 0 | 0.01 |
| Room B | 0.10 | 0.70 | 0.10 | 0 | 0 | 0.10 | 0 | 0 |
| Room C | 0 | 0.10 | 0.70 | 0.10 | 0.10 | 0 | 0 | 0 |
| Room G | 0 | 0 | 0.10 | 0.80 | 0.10 | 0 | 0 | 0 |
| Room D | 0 | 0 | 0.10 | 0.10 | 0.80 | 0 | 0 | 0 |
| Room E | 0 | 0.10 | 0 | 0 | 0 | 0.80 | 0.10 | 0 |
| Room F | 0 | 0 | 0 | 0 | 0 | 0.10 | 0.09 | 0 |
| Room X | 0.01 | 0 | 0 | 0 | 0 | 0 | 0 | 0.99 |

FIG. 10

|  | Room A | Room B | Room C | Room G | Room D | Room E | Room F |
|---|---|---|---|---|---|---|---|
| Instance 1 | 0 persons | 0 persons | 0 persons | 1 person | 1 person | 1 person | 0 persons |
| Instance 2 | 0 persons | 0 persons | 0 persons | 1 person | 1 person | 1 person | 0 persons |
| Instance 3 | 0 persons | 0 persons | 0 persons | 1 person | 1 person | 1 person | 0 persons |
| Instance 4 | 0 persons | 0 persons | 0 persons | 1 person | 0 persons | 1 person | 0 persons |

FIG. 11

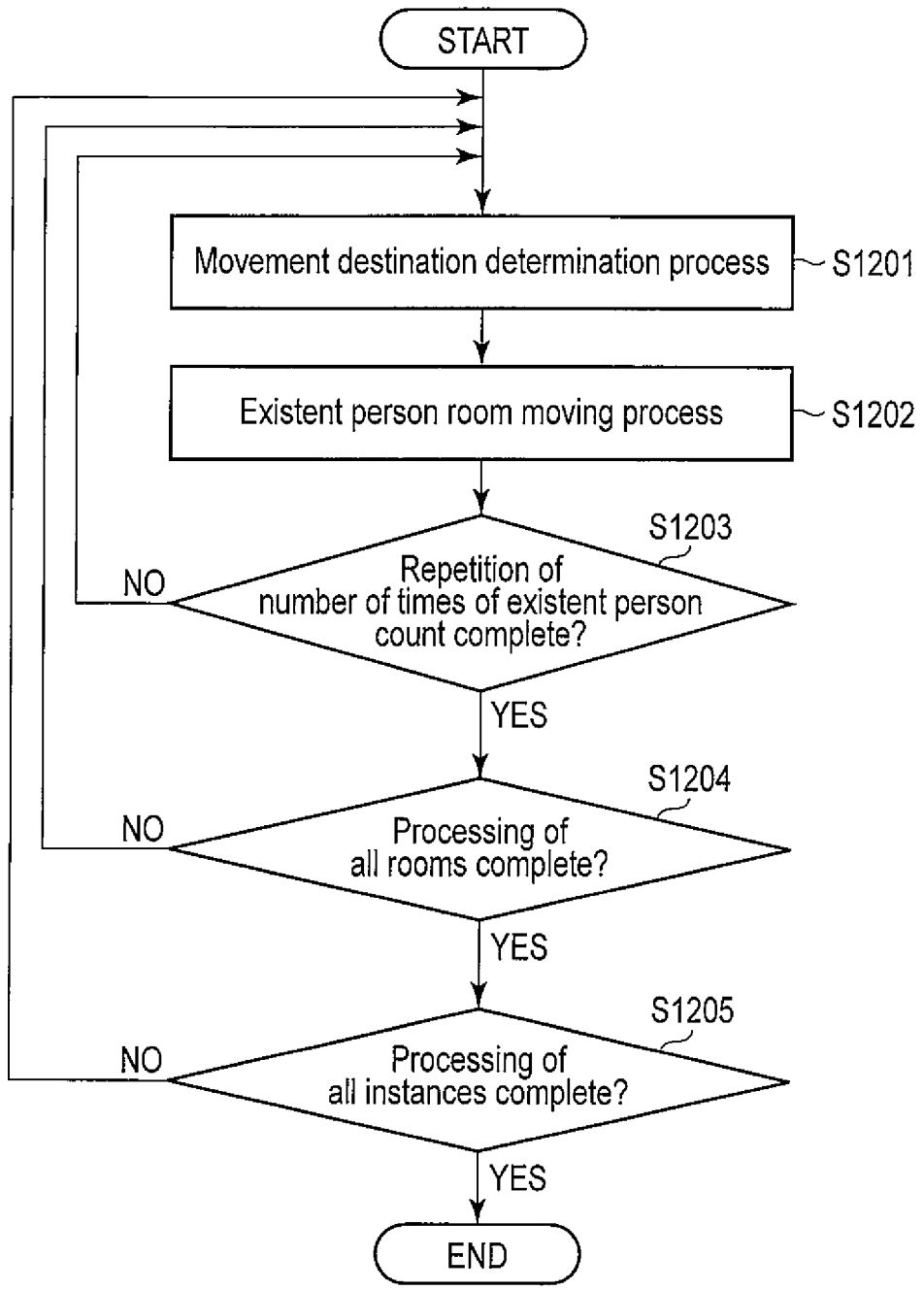
F I G. 12

|  | Room A | Room B | Room C | Room G | Room D | Room E | Room F |
|---|---|---|---|---|---|---|---|
| Instance 1 | 0 persons | 0 persons | 0 persons | 0 persons | 2 persons | 0 persons | 1 person |
| Instance 2 | 0 persons | 0 persons | 0 persons | 1 person | 1 person | 0 persons | 1 person |
| Instance 3 | 0 persons | 0 persons | 0 persons | 2 persons | 0 persons | 1 person | 0 persons |
| Instance 4 | 0 persons | 0 persons | 0 persons | 0 persons | 1 person | 0 persons | 1 person |
F I G. 13
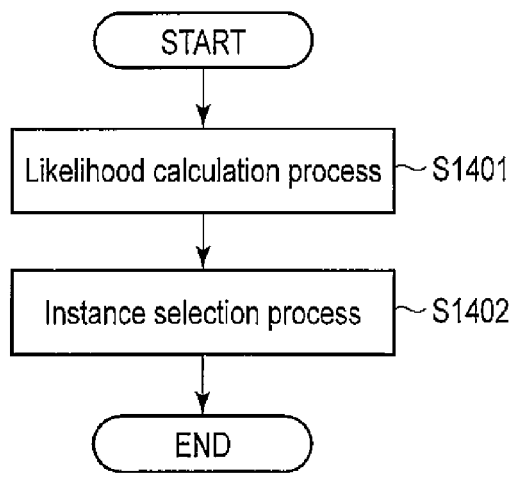
F I G. 14

|  | Likelihood ratio |
|---|---|
| Instance 1 | 0.24 |
| Instance 2 | 0.51 |
| Instance 3 | 0.01 |
| Instance 4 | 0.24 |

|  | Room A | Room B | Room C | Room G | Room D | Room E | Room F |
|---|---|---|---|---|---|---|---|
| Instance 1 | 0 persons | 0 persons | 0 persons | 0 persons | 2 persons | 0 persons | 1 person |
| Instance 2 | 0 persons | 0 persons | 0 persons | 1 person | 1 person | 0 persons | 1 person |
| Instance 3 | 0 persons | 0 persons | 0 persons | 1 person | 1 person | 0 persons | 1 person |
| Instance 4 | 0 persons | 0 persons | 0 persons | 0 persons | 1 person | 0 persons | 1 person |

FIG. 17

| Number of instances | Room A | Room B | Room C | Room G | Room D | Room E | Room F |
|---|---|---|---|---|---|---|---|
| 2 numbers | 0 persons | 0 persons | 0 persons | 1 person | 1 person | 0 persons | 1 person |
| 1 number | 0 persons | 0 persons | 0 persons | 0 persons | 2 persons | 0 persons | 1 person |
| 1 number | 0 persons | 0 persons | 0 persons | 0 persons | 1 person | 0 persons | 1 person |

FIG. 18

| Room A | Room B | Room C | Room G | Room D | Room E | Room F |
|---|---|---|---|---|---|---|
| 0 persons | 0 persons | 0 persons | 0.5 persons | 1.25 persons | 0 persons | 1 person |

FIG. 19

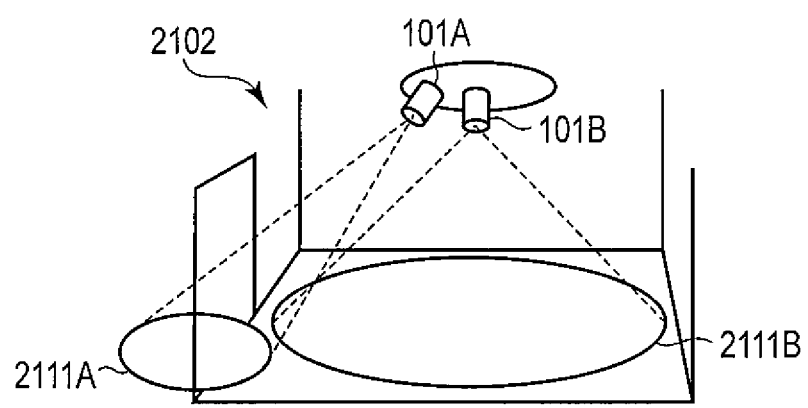
F I G. 22

EXISTENT PERSON COUNT ESTIMATION APPARATUS

CROSS REFERENCE TO RELATED APPLICATIONS

This application is a Continuation Application of PCT Application No. PCT/JP2009/065432, filed Sep. 3, 2009, the entire contents of which are incorporated herein by reference.

FIELD

Embodiments described herein relate generally to an existent person count estimation apparatus for estimating the numbers of persons existing in respective areas of, for example, a house or office.

BACKGROUND

When watching over residents and controlling devices in accordance the situation, it is necessary to monitor the state such as the positions of the residents. As a method for acquiring position information, methods using, for example, a surveillance camera, infrared image sensor, floor pressure sensor, ultrasonic sensor, and a combination of wireless tag and reader are conventionally known. When using these advanced sensors, however, the problems of privacy and cost arise.

JP-A 2008-77361(KOKAI) discloses a monitoring system for estimating the number of persons existing in each area by combining a pyroelectric sensor and person count sensor.

The monitoring system disclosed in JP-A 2008-77361 (KOKAI) estimates the number of persons existing in a specific area by sensing the number of persons having passed the doorway. However, this estimation is based on the assumption that only one person passes through the doorway at one time, and this makes it difficult to accurately estimate the number of persons existing in each area. Also, the problem of cost arises because a person count sensor is additionally necessary.

Accordingly, an existent person count estimation apparatus is required to accurately estimate the number of existent persons. When the number of persons existing in each area is accurately estimated, it is possible to perform device control corresponding to the number of persons existing in each area, for example, control on/off of an illumination lamp or the operation mode of an air conditioner, thereby reducing unnecessary energy consumption.

BRIEF DESCRIPTION OF THE DRAWINGS

FIG. 1 is a block diagram showing an existent person count estimation apparatus according to a first embodiment.

FIG. 2 is a block diagram showing a hardware configuration example of the existent person count estimation apparatus shown in FIG. 1.

FIG. 4 is a schematic view showing an example of room-to-room connection relationship information shown in FIG. 1.

FIG. 5 is a schematic view showing an example of indoor-to-outdoor connection relationship information shown in FIG. 1.

FIG. 6 is a schematic view showing an example of sensing area overlap relationship information shown in FIG. 1.

FIG. 10 is a schematic view showing an example of a transition matrix.

FIG. 11 is a schematic view showing examples of instances at immediately preceding time.

FIG. 12 is a flowchart showing an example of the procedure of an instance prediction process.

FIG. 13 is a schematic view showing examples of instances at present time.

FIG. 14 is a flowchart showing an example of the procedure of an instance evaluation process.

FIG. 17 is a schematic view showing examples of instances after the instance selection process.

FIG. 18 is a schematic view showing an example of output information.

FIG. 19 is a schematic view showing another example of the output information.

FIG. 22 is an exemplary view showing an example of the layout of the motion sensors.

DETAILED DESCRIPTION

Figure 3:
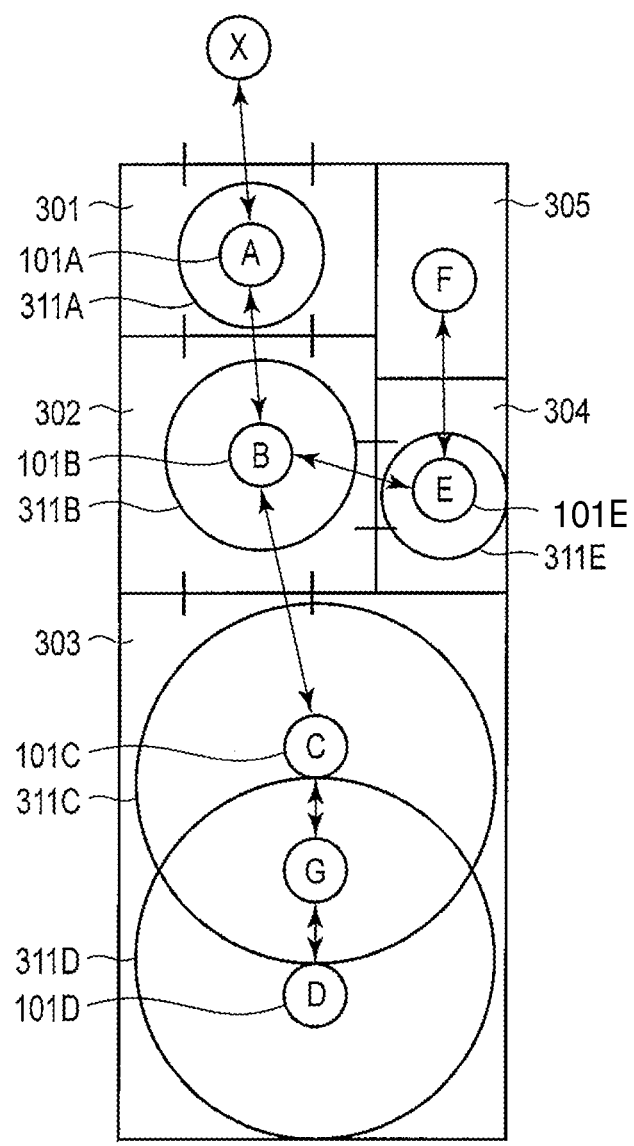
FIG. 3 is an exemplary view showing an example of an environment to which the existent person count estimation apparatus shown in FIG. 1 is applied.

In general, according to one embodiment, an existent person count estimation apparatus includes a plurality of motion sensors, a collection unit, a storage, a transition matrix generation unit, an instance prediction unit, a likelihood calculation unit, an instance selection unit, and an output unit. The motion sensors have a plurality of sensing areas, the sensing areas being provided in first areas in which existent person counts are to be estimated, the motion sensors each configured to sense presence or absence of a human or a human motion in a corresponding sensing area of the sensing areas to generate a sensing signal. The motion sensors generate sensing signals corresponding to the sensing areas, the sensing signals including the sensing signal. The collection unit is configured to collect the sensing signals from the motion sensors to generate human sensing information. The storage is configured to store first instances and connection relationship information, each of the first instances including estimate values of existent person counts for the first areas, the connection relationship information including one or more first connection relationships between the first areas and second connection relationships between the first areas and a second area different from the first areas. The transition matrix generation unit is configured to calculate first transition probabilities, each of the first transition probabilities indicating a probability that a person moves from each of the first areas to another first area, and to generate a transition matrix having the first transition probabilities as matrix elements. The instance prediction unit is configured to predict second instances at present time from the first instances by using the transition matrix, and to store, as new first instances, the second instances in the storage. The likelihood calculation unit is configured to calculate likelihoods of the second instances using the human sensing information and the overlap relationship information. The instance selection unit is configured to select one or more third instances from the second instances, each of the third instances having a likelihood higher than a predetermined threshold. The output unit is configured to calculate a number of identical third instances from the third instances to generate output information, the output information including estimate values of existent person counts for the first areas included in the third instances, in association with the calculated number of the identical third instances.

The embodiment provides the existent person count estimation apparatus capable of accurately estimating the numbers of persons in respective areas at low cost.

Hereinafter, existent person count estimation apparatuses according to embodiments will be described with reference to the accompanying drawings. In the embodiments, like reference numbers denote like elements, and duplication of explanation will be avoided.

First Embodiment

FIG. 1 schematically shows an existent person count estimation apparatus 100 according to a first embodiment. The existent person count estimation apparatus 100 can estimate, for respective rooms or areas, the numbers of persons (also referred to as existent person counts) existing in the interior of a building, for example, a house or office as will be described later with reference to FIG. 3. A "room" described herein means not only a room such as a living room, bedroom, or kitchen in a house, but also any area in which the number of persons is to be estimated.

The existent person count estimation apparatus 100 includes a motion sensor group 101 including a plurality of motion sensors 101A to 101C. Specific areas are assigned as sensing areas to the motion sensors 101A to 101C, respectively. Each of the motion sensors 101A to 101C senses or detects the presence or absence of a human or human motion in the sensing area, and transmits a sensing signal to a collection unit 102. The collection unit 102 is linked to motion sensors 101A to 101C by wired or wireless connections.

As the motion sensor, it is possible to utilize a sensor that senses the existence of a moving human, for example, a pyroelectric infrared sensor or thermopile type infrared sensor. When using pyroelectric infrared sensors as motion sensors 101A to 101C, motion sensors 101A to 101C are arranged on the ceiling or the like, and each sense the presence or absence of a human by sensing his or her motion in the sensing area. More specifically, motion sensors 101A to 101C including pyroelectric infrared sensors each sense the change in infrared energy emitted from the sensing area as an electrical change by a pyroelectric element, thereby sensing the motion of a human emitting the infrared rays. Motion sensors 101A to 101C are not limited to the above-mentioned examples, and may be sensors or devices capable of sensing the presence or absence of a human or human motion. Therefore, it is possible to use, for example, a camera, a floor pressure sensor, an ultrasonic sensor, or a household electrical appliance capable of outputting, as a sensing signal, a signal indicating that the appliance is operated by a human. The motion sensor group 101 may also be formed by combining the various types of sensors as described above.

The collection unit 102 collects sensing signals from motion sensors 101A to 101C, and transmits the collected sensing signals as human sensing information to a control unit 103 and an instance evaluation unit 105. The human sensing information may include time information indicating the receipt times of the sensing signals, i.e., time information indicating the time at which the presence of absence of a human or human motion is sensed. Specifically, the collection unit 102 stores the time (final sensing time) at which the presence or absence of a human or human action is sensed last in each room, and periodically transmits the human sensing information including the final sensing time of each room. Alternatively, the collection unit 102 may calculate a non-sensing time indicating the time elapsed from the final sensing time, and transmit the human sensing information including the non-sensing time of each room.

The control unit 103 sequentially operates a one-future-period prediction unit 104, the instance evaluation unit 105, and an output unit 106 at a predetermined timing, for example, immediately after receiving the human sensing information received from the collection unit 102. The control unit 103 can also initialize an instance set 111 storing a plurality of instances. An "instance" described herein means data indicating estimate values of existent person counts for respective target areas (for example, rooms). The target areas denote areas in each of which an existent person count is to be estimated. As will be explained later, these instances have a data structure as shown in FIG. 11.

The one-future-period prediction unit 104 shown in FIG. 1 updates the instance set 111 by using room-to-room connection relationship information 109 indicating the connection relationships between rooms, and indoor-to-outdoor connection relationship information 110 indicating the connection relationships between rooms and outdoors. Specifically, the one-future-period prediction unit 104 includes a transition matrix generation unit 104A and instance prediction unit 104B. The transition matrix generation unit 104A generates a transition matrix by using the room-to-room connection relationship information 109 and indoor-to-outdoor connection relationship information 110. The instance prediction unit 104B predicts instances at present time, by using the transition matrix, from each instance (also called an instance at immediately preceding time) initialized by the control unit 103 or previously updated by the one-future-period prediction unit 104 and instance evaluation unit 105, and updates the instance set 111 by using the predicted instances.

The instance evaluation unit 105 evaluates the instances predicted by the one-future-period prediction unit 104, by using the human sensing information received from the collection unit 102. More specifically, the instance evaluation unit 105 updates the instance set 111 by erasing an instance deviating from the person existence status of each room based on the human sensing information, and duplicating an instance matching the person existence status. The instance evaluation unit 105 includes a likelihood calculation unit 105A and instance selection unit 105B. The likelihood calculation unit 105A calculates the likelihood of each instance by using the human sensing information, and overlap relationship information 112 concerning areas (also called overlap areas) in which the sensing areas of motion sensors 101A to 101C overlap each other. The instance selection unit 105B selects an instance to be erased and an instance to be duplicated, by comparing the likelihoods of instances.

The output unit 106 generates output information concerning the numbers of persons existing in respective rooms from the instances in the instance set 111 updated by the evaluation unit 105, and outputs the output information to a display device 107 and control target device 108. The display device 107 includes a display capable of displaying the output information from the output unit 106, and a printer, and can also include a display unit 204 shown in FIG. 2. The control target device 108 is, for example, a general-purpose computer, household electric appliance, or household equipment to be controlled in accordance with the output information from the output unit 106. The output unit 106 is connected to the display device 107 and control target device 108 across a communication network such as a wired local area network (LAN), wireless LAN, Bluetooth®, serial communication, or parallel communication.

FIG. 2 shows a hardware configuration example of the existent person count estimation apparatus 100. The existent person count estimation apparatus 100 may be implemented by using a general-purpose computer device 200 as basic hardware. As shown in FIG. 2, the computer device 200 includes a CPU 202, an input unit 203, the display unit 204, a communication unit 205, a main storage 206, and an external storage 207, and these are connected by a bus 201 so that these can communicate with each other.

The input unit 203 includes input devices such as a keyboard and mouse, and outputs an operation signal according to a user's operation of the input devices to the CPU 202.

The display unit 204 is a display device such as a liquid crystal display (LCD) or cathode ray tube (CRT) display.

The communication unit 205 communicates with motion sensors 210A, 210B, 210C using a communication method such as Ethernet, a wireless local area network (LAN), or Bluetooth®.

The external storage 207 is, for example, a hard disk or a recording medium such as a CD-R, CD-RW, DVD-RAM, or DVD-R, and stores control programs for causing the CPU 202 to execute processes by the collection unit 102, control unit 103, one-future-period prediction unit 104, instance evaluation unit 105, and output unit 106 described above.

The main storage 206 is a memory or the like. Under the control of the CPU 202, the main storage 206 expands the control programs stored in the external storage 207, and stores, for example, data necessary to execute the programs, and data generated by the execution of the programs.

The existent person count estimation apparatus 100 may be implemented by preinstalling the above-mentioned control programs in a computer device, or may also be implemented by storing the programs in a recording medium such as a CD-ROM or distributing the programs across a network, and installing the programs in a computer device. Also, the room-to-room connection relationship information 109, indoor-to-outdoor connection relationship information 110, instance set 111, and overlap relationship information 112 shown in FIG. 1 can be implemented by using, for example, a memory, a hard disk, or a recording medium such as a CD-R, CD-RW, DVD-RAM, or DVD-R, that is to say, the main storage 206 and external storage 207 incorporated into or attached to the above-mentioned computer device.

In addition to the constituent elements described above, the computer device 200 may include a printer for printing out, for example, information indicating an abnormality in the existent person count estimation apparatus 100 and information stored in the room-to-room connection relationship information 109, indoor-to-outdoor connection relationship information 110, instance set 111, and overlap relationship information 112. The hardware configuration of the existent person count estimation apparatus 100 may be changed according to the situation.

FIG. 3 shows the layout of a house as an example to which the existent person count estimation apparatus 100 shown in FIG. 1 is applied. As shown in FIG. 3, a motion sensor 101A is placed in an entrance (also called room A) 301, and an area 311A in the entrance 301 is assigned as a sensing area to motion sensor 101A. Likewise, motion sensors 101B, 101C, 101D, and 101E are respectively placed in a kitchen (also called room B) 302, the north side (also called room C) of a Western-style room 303, the south side (also called room D) of the Western-style room 303, and a lavatory (also called room E) 304, and areas 311B, 311C, 311D, and 311E are respectively assigned as sensing areas to motion sensors 101B, 101C, 101D, and 101E. In the Western-style room 303, the sensing areas 311C and 311D partially overlap each other. The area in which the sensing areas 311C and 311D overlap is set as virtual room G. Also, no motion sensor is installed in a bathroom (also called room F) 305.

Arrows shown in FIG. 3 indicate the connection relationships between rooms between which people can move. For example, a person in room A can move to room B or to the outside (also called room X or the out-of-area) that is not an existent person count estimation target. FIGS. 4 and 5 respectively show examples of the room-to-room connection relationship information 109 and indoor-to-outdoor connection relationship information 110 for the layout shown in FIG. 3. In each field of the room-to-room connection relationship information 109 shown in FIG. 4, "1" is stored when people can move between the rooms, that is to say, when the rooms are adjacent, and "0" is stored when they are not adjacent. The room-to-room connection relationship information 109 shown in FIG. 4 indicates that people can move from room A to room B, and can stay in room A. Similarly, in each field of the indoor-to-outdoor connection relationship information 110 shown in FIG. 5, "1" is stored when the room and outside are adjacent, and "0" is stored when the room and outside are not adjacent. The indoor-to-outdoor connection relationship information 110 shown in FIG. 5 indicates that people can move from room A to the outside (room X), and can move from the outside to room A.

Note that the room-to-room connection relationship and indoor-to-outdoor connection relationship can be prepared as different pieces of information, and can also be prepared as the single connection relationship information.

FIG. 6 shows an example of the overlap relationship information 112 pertaining to the overlap areas of the motion sensors in the layout shown in FIG. 3. In the overlap relationship information 112 as shown in FIG. 6, when a diagonal element (that is to say, an element having the same index in a row and column) is "1", a motion sensor is installed in a room specified by the index; when the diagonal element is "0", no motion sensor is installed in a room specified by the index. Also, when the non-diagonal element is "1", the sensing areas of two rooms specified by the two indexes overlap each other. The overlap relationship information 112 shown in FIG. 6 illustrates that motion sensors are installed in rooms A to E, no motion sensor is installed in rooms F and G, the sensing areas of rooms C and D overlap, and the overlap area is set as virtual room G.

Next, a procedure of the existent person count estimation apparatus 100 will be specifically explained by referring to the house shown in FIG. 3 as a specific example.

Figure 7:
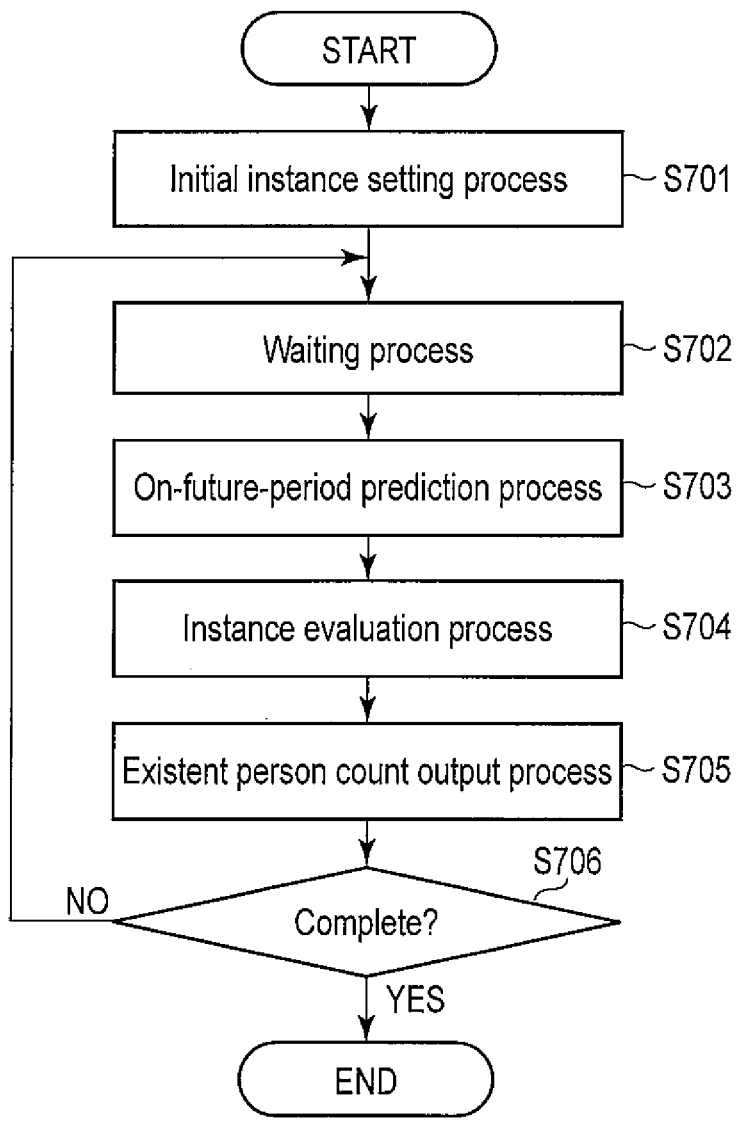
FIG. 7 is a flowchart showing an example of a procedure of estimating the number of existent persons.

FIG. 7 shows an example of the procedure of the existent person count estimation apparatus 100. As shown in FIG. 7, when the existent person count estimation apparatus 100 starts operating, the control unit 103 initializes the instance set 111 in step S701. In this initialization, a process of calculating correct estimate values takes a long time if an instance largely different from the actual person existence status, that is to say, the person existence status obtained from the human sensing information, is set. Therefore, the control unit 103 initializes the instance set 111 by using, for example, the following method. That is, the control unit 103 generates a plurality of instances by random numbers so as to satisfy preset limiting conditions such as the number of persons in the entire house and a maximum number of persons in each room, or generates all states meeting the limiting conditions as instances.

In step S702, the control unit 103 temporarily stops the process until the control unit 103 receives the human sensing information from the collection unit 102, or is periodically called by an internal timer. After restoring from this temporary stop, the control unit 103 executes a one-future-period prediction process shown in FIG. 8 in step S703, an instance evaluation process shown in FIG. 14 in step S704, and an existent person count output process in step S705. The series of processes shown in steps S702 to S705 are repetitively executed until the control unit 103 designates termination (step S706), and the instance set 111 is successively updated.

Figure 8:
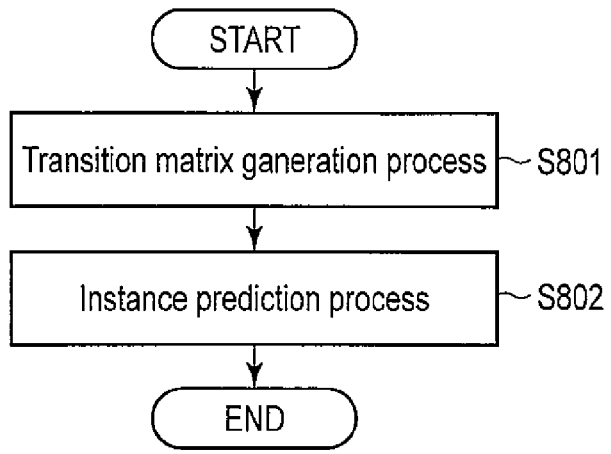
FIG. 8 is a flowchart showing an example of the procedure of a one-future-period prediction process.

FIG. 8 shows an example of the procedure of the one-future-period prediction process shown in step S703 of FIG. 7. In step S801 of FIG. 8, the transition matrix generation unit 104A generates a transition matrix from the room-to-room connection relationship information 109 and indoor-to-outdoor connection relationship information 110. In step S802, the instance prediction unit 104B predicts instances at present time from instances at immediately preceding time by using the generated transition matrix, and updates the instance set 111 by the predicted instances.

Figure 9:
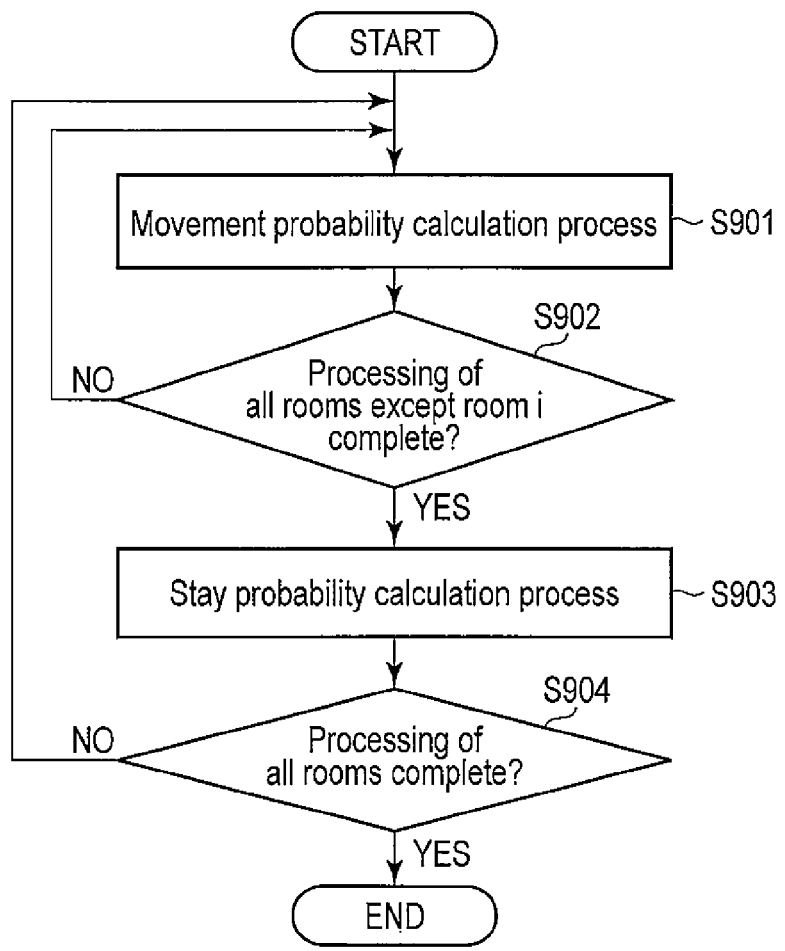
FIG. 9 is a flowchart showing an example of the procedure of a transition matrix formation process.

FIG. 9 shows an example of the procedure of the transition matrix formation process shown in step S801 of FIG. 8. In step S901 of FIG. 9, the transition matrix generation unit 104A calculates a transition probability $P_{ij}$ that a person moves from a room (also called a movement start room) i to another room (also called a movement destination room) j. Letting a be the probability of movement to an adjacent room; b, the probability of movement to the outside; $d_{ij}$, the connection relationship between rooms i and j; $g_i$, the connection relationship between the outside and room i; and $g_j$, the connection relationship between the outside and room j, the transition probability $P_{ij}$ is calculated by equation (1) below. The higher the movement probability a, the more easily the movement to another room occurs. The higher the movement probability b, the more easily the movement to the outside and the movement from the outside occur. The transition probability $P_{ij}$ is calculated for all rooms j except for the movement start room i (step S902).

$$p_{ij} = \begin{cases} a \times d_{ij} & \text{(when } i \text{ and } j \text{ are indoor)} \\ b \times g_i & \text{(when } i \text{ is indoor, and } j \text{ is outdoor)} \\ b \times g_j & \text{(when } i \text{ is outdoor, and } j \text{ is indoor)} \end{cases} \quad \text{Equation (1)}$$

where i≠j.

In step S903, the one-future-period prediction unit 104 calculates a transition probability (also called a stay probability) $P_{ii}$ that a person stays in the movement start room i. The transition probability $P_{ii}$ is calculated from equation (2) below by using the transition probability $P_{ij}$ calculated in steps S901 and S902.

$$p_{ii} = 1 - \sum_{j \neq i} p_{ij} \quad \text{Equation (2)}$$

The calculations shown in steps S901 to S903 are executed for all movement start rooms i (step S904). Therefore, a transition matrix P having the transition probabilities calculated in steps S901 to S904 as matrix elements is generated. FIG. 10 shows the transition matrix P calculated by assuming that a=0.1 and b=0.01, by using the connection relationship information 109 and 110 shown in FIGS. 4 and 5.

FIG. 11 shows a data structure example of the instances in the instance set 111. In this example shown in FIG. 11, four instances given indices from instance 1 to instance 4 are stored in the instance set 111. The number N of instances stored in the instance set 111 can be changed in accordance with the status, for example, the number of rooms.

FIG. 12 shows the procedure of the instance prediction process shown in step S802 of FIG. 8. In step S1201 of FIG. 12, the instance prediction unit 104B determines whether a person existing in room i at a given instance k (k is an integer satisfying 1≤k≤N) at the immediately preceding time moves to a given room j or outdoors, by using the transition matrix P calculated in step S801. More specifically, since a horizontal vector in the $i^{th}$ row in the transition matrix is the probability of movement from room i to each room, the instance prediction unit 104B generates random numbers in accordance with this probability, and samples one movement destination room j. For example, as shown in FIG. 10, the probability that a person existing in room G stays in it is 0.8, and the probability that the person moves to room C or D is 0.1. In accordance with these probabilities, therefore, the instance prediction unit 104B determines whether this person stays in room G or moves to room C or D by using random numbers.

In step S1202, in accordance with the movement destination room j (room j can also be the same as room i) determined in step S1201, the instance prediction unit 104B decreases the number of persons in the movement start room i by one, and increases the number of persons in the movement destination room j by one. If the movement destination room determined in step S1201 is room X, the instance prediction unit 104B decreases the number of persons in the movement start room i by one. The processes in steps S1201 and S1202 are repeated the number of times equal to the number of persons existing in the movement start room i at the instance k at immediately preceding time (step S1203). In step S1204, the processes shown in steps S1201 to S1203 are executed for all rooms, for example, repetitively executed for rooms A to F. Then, the processes shown in steps S1201 to S1204 are repetitively executed for all the instances, in step S1205.

FIG. 13 shows an example of the instance set 111 after the instance prediction process is executed for the instance set 111 shown in FIG. 11. As shown in FIGS. 11 and 13, at instance 1, a person moves from room G to room D, and another person moves from room E to room F. At instance 2, a person moves from room E to room F. At instance 3, a person moves from room D to room G. At instance 4, a person moves from room G to room D, and another person moves from room E to room F.

In accordance with the processing as described above, the one-future-period prediction unit 103 predicts instances at present time from the instances at immediately preceding time, and updates the instance set 111.

Note that the transition matrix formation process shown in step S801 of FIG. 8 need not be executed each time, and the transition matrix P may also be precalculated and prestored in the external storage 207 or the like.

FIG. 14 shows an example of the procedure of the instance evaluation process shown in step S704 of FIG. 7. The instance evaluation unit 105 executes the likelihood calculation unit 105A and instance selection unit 105B, thereby evaluating whether each instance in the instance set 111 updated by the one-future-period prediction unit 104 matches the person existence status of each room based on the human sensing information. In step S1401 of FIG. 14, the likelihood calculation unit 105A executes a likelihood calculation process of calculating likelihoods w of the instances in the instance set 111, by using the overlap relationship information 112 and human sensing information. The likelihood w of the instance k is calculated by $$w = \prod_{i \in \{j | H_{jj}=1\}} N(|s_i - r_i|; \mu = 0, \sigma) \quad \text{Equation (3)}$$

This equation calculates the likelihood w by assuming that the difference between a value (also called a first presence-or-absence value) $s_i$ indicating the presence or absence of a person in room i calculated from the number of persons existing in each room at the instance k and a value (also called a second presence-or-absence value) $r_i$ indicating the presence/absence of a person in room i calculated from the person existence status of each room specified by the human sensing information complies with a normal distribution N (x; $\mu$=0,$\sigma$) in which an average $\mu$ is 0 and a standard deviation is a. The normal distribution N (x; $\mu$=0,$\sigma$) is defined by $$N(x; \mu = 0, \sigma) = \frac{1}{\sqrt{2\pi}\,\sigma} \exp\left(-\frac{(x-\mu)^2}{(2\sigma)^2}\right) \quad \text{Equation (4)}$$

Also, $H_{jj}$ indicates the overlap relationship information 112. Accordingly, room i except for a virtual room (for example, room G) where the sensing regions overlap and a room (for example, room F) where no motion sensor is installed is a calculation target of the likelihood w. The value $s_i$ is calculated by $$s_{k \in \{j | H_{ij}=1\}} = \begin{cases} 1 & (x_k > 0) \\ 0 & (x_k = 0) \end{cases} \quad \text{Equation (5)}$$

Equation (5) converts the number $x_i$ of persons in room i at the instance k into presence (1) or absence (0). For example, $s_D = s_F = 1$ and $s_A = s_B = s_C = s_E = 0$ at instance 1 shown in FIG. 13. Furthermore, the value $r_i$ is calculated by $$r_i = \begin{cases} 1 & \left(\text{For } \forall_{j \in adj(i)}\ y_i > y_j,\ \sum_{j \in adj(i)} \beta_j = 0\right) \\ f\left(t - y_i; \alpha_i, \max_{j \in adj(i)} \beta_j\right) & \left(\text{For } \forall_{j \in adj(i)}\ y_i > y_j,\ \sum_{j \in adj(i)} \beta_j > 0\right) \\ f(t - y_i; \alpha_i, 0) & \text{(in other cases)} \end{cases} \quad \text{Equation (6)}$$

where j∈adj(i) represents the adjacent room j of room i, and $y_i$ represents the final sensing time in room i. An elapsed time t−$y_i$ from the final sensing time $y_i$ to present time t matches a non-sensing time in room i. A function f is given as a function which decreases the probability that a person exists in room i decreases in accordance with the non-sensing time t−$y_i$, for example, as a function by which a value as indicated by equation 7 below monotonically reduces from 1 to 0.

$$f(t; \alpha, \beta) = \begin{cases} 1 & (t < 0) \\ 1 - \frac{1}{2\beta}t & (0 \le t < \beta) \\ \frac{\alpha}{2(\alpha-\beta)} - \frac{1}{2(\alpha-\beta)}t & (\beta \le t < \alpha) \\ 0 & (t \le \alpha) \end{cases} \quad \text{Equation (7)}$$

where a parameter $\alpha_i$ represents a non-sensing time before it is determined that no person exists in room i, and a parameter $\beta_i$ represents a non-sensing time before it is determined that a person has moved from room i to, for example, a room in which no sensor is installed or outdoors (hereinafter, referred to as a transition destination room). The parameters $\alpha_i$ and $\beta_i$ can be changed from one room to another. In a corridor (also called room S), for example, the possibility that a motion sensor does not react for a long time although a person exists is low. In a bedroom (also called room T), however, even when a person exists in the sensing area, almost no motion may be sensed because, for example, the person is asleep. This increases the possibility that there is no reaction for a long time even though a person exists. Therefore, a small value is set for $\alpha_S$, and a large value is set for $\alpha_T$.

Equation (6) is classified into three cases. The value $r_i$ is calculated by the upper expression of equation (6), if the presence/absence of a moving person is sensed last in room i instead of the adjacent room j, and if the adjacent room does not include a transition destination room. In this case, it is unlikely that the person has moved to the adjacent room, so the person necessarily exists in room i, that is to say, $r_i$=1 always holds. The value $r_i$ is calculated by the middle expression of equation (6), if the presence/absence of a moving person is sensed last in room i instead of the adjacent room, and if the adjacent room includes one or more transition destination rooms. In this case, the person may have moved from room i to a transition destination room, so 0≤$r_i$≤1. Furthermore, the value $r_1$ is calculated by the lower expression of equation (6), if the presence/absence of a moving person is sensed last in the adjacent room instead of room i. In this case, it is highly likely that the person has moved from room i to the adjacent room, so 0≤$r_i$≤0.5.

Figures 15, 16:
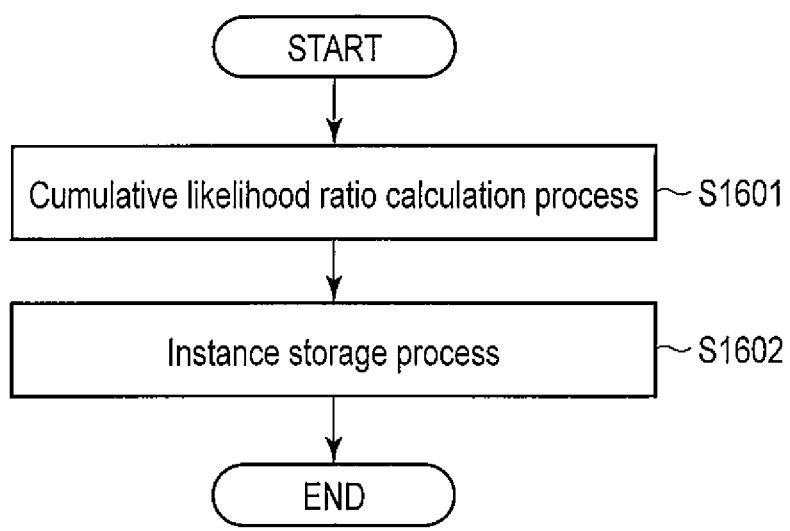
FIG. 15 is a schematic view showing examples of the results of likelihood calculations.
FIG. 16 is a flowchart showing an example of the procedure of an instance selection process.

FIG. 15 shows examples of calculation results obtained by executing the likelihood calculation process in step S1401 for the instances shown in FIG. 13. Referring to FIG. 15, the likelihood w of each instance is normalized such that the total likelihood of all the instances is 1, and indicated as a likelihood ratio.

Note that in step S1401 of FIG. 14, the likelihood w of the instance k can also be calculated by $$w = \prod_{i \in \{j | H_{jj}=1\}} N(|z_i - y_i|; \mu = 0, \sigma), \quad \text{Equation (8)}$$

$$\text{for } z_i = \begin{Bmatrix} 1 & (x_i^{new} \neq x_i^{old}) \\ r & (x_i^{new} = x_i^{old}) \end{Bmatrix}$$

where $x_i^{new}$ represents the number of persons in room i at the instance k calculated by the one-future-period prediction process, $x_i^{old}$ represents the number of persons in room i at the instance k before being calculated by the one-future-period prediction process, and r represents uniform random numbers from 0 to 1.

In step S1402 of FIG. 14, the instance evaluation unit 105 compares the likelihoods w of the instances calculated in step S1401, and executes an instance selection process of erasing an instance having a low likelihood w, and duplicating an instance having a high likelihood w. FIG. 16 shows an example of the instance selection process in step S1402. In step S1601 shown in FIG. 16, the instance selection unit 105B calculates a cumulative likelihood ratio vk as the sum of the ratios of the likelihoods w from instance 1 to the instance k, from the likelihoods w of the instances calculated in step S1401, as indicated by $$v_k = \sum_{m=1}^{k} \frac{w_m}{\sum_l w_l} \times N \qquad \text{Equation (9)}$$

where N is the number of instances stored in the instance set 111, and wm represents the likelihood w of an instance m. In step S1602, the instance selection unit 105B duplicates instances k equal in number to an integer n satisfying vk−1<n−ε≤vk, and stores the duplicated instances k. A parameter ε is a value exceeding 0 and smaller than 1, and is preset. If there is no integer n satisfying vk−1<n−ε≤vk, the instance selection unit 105B erases the instance k. By these processes, the instance selection unit 105B erases an instance having a low likelihood w, and duplicates an instance having a high likelihood w. The instance selection process shown in FIG. 16 is an example, and instances to be erased and duplicated may be selected by another method. For example, it is also possible to preset a threshold for a likelihood ratio, duplicate an instance if the likelihood ratio calculated for the instance in step S1402 is greater than or equal to the threshold, and erase the instance if the likelihood ratio is smaller than the threshold.

FIG. 17 shows examples of results when the instance selection process is executed for the instances shown in FIG. 13. When using the values shown in FIG. 15, the cumulative likelihood ratios of the instances shown in FIG. 13 are v1=0.96, v2=3.00, v3=3.04, and v4=4.00. Consequently, when the parameter ε is set to 0.1, for example, instance 3 shown in FIG. 13 is deleted, and instance 2 shown in FIG. 13 is duplicated to generate instances 2 and 3, as shown in FIG. 17.

As described above, the instance set 111 is updated by sequentially executing the one-future-period prediction process in step S703 and the instance evaluation process in step S704 shown in FIG. 7. In step S705, the output unit 106 outputs, to the display device 107 and control target device 108, output information indicating the number of persons existing in each room from the updated instance set 111. As shown in FIG. 18, the output unit 106 can calculate the number of instances at which the same number of persons exist in all rooms, and output instances rearranged in descending order of the number as the output information. By thus outputting instances together with the total number of the same instances, the control target device 108 can execute various processes, for example, use instances having a large total number, or calculate the average of 10 upper instances. As shown in FIG. 19, the output unit 106 can also calculate the average value of existent persons for each room from N instances, and output the average existent person count of each room as a typical value. Outputting one data such as a typical value facilitates replacing the output information from the output unit 106 with output information concerning the number of persons existing in each room estimated by another method. Another advantage is that people can readily understand the output information.

Examples of the control target device 108 to be controlled in accordance with the number of existent persons are a light, air conditioner, fan, air cleaner, television, and personal computer. For example, the light installed in the room 303 shown in FIG. 3 is controlled to be turned off when it is estimated that the total number of persons existing in rooms C, D, and G is 0.2 or less. Also, for an air conditioner, fan, air cleaner, and the like, it is possible to control, for example, the operation level (high/low) or the operation mode in accordance with the number of existent persons. Unnecessary power consumption can be suppressed by thus controlling the operations of various devices in accordance with the number of existent persons.

The output unit 106 may output the output information to a controller (not shown), and the controller may control the operation of the above-mentioned control target device 108 in accordance with the number of persons existing in each room.

Note that rooms (or areas) as targets of person count estimation are not limited to the examples shown in FIG. 3, and can include, for example, a living room, a toilet, a bedroom, and a conference room in an office.

As described above, the existent person count estimation apparatus according to the first embodiment prepares a plurality of instances each indicating the numbers of persons existing in respective rooms, predicts instances at present time based on these instances, and selects, from the predicted instances at present time, an instance matching the person existence status based on the human sensing information by likelihood calculations. This existent person count estimation apparatus can accurately estimate the numbers of persons existing in respective rooms (or areas) by selecting, from the predicted instances, an instance well matching the actual person existence status.

Second Embodiment

Figure 20:
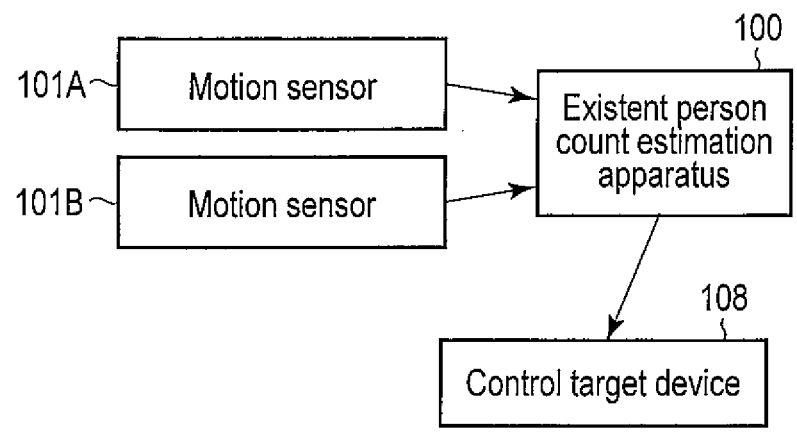
FIG. 20 is a block diagram schematically showing an existent person count estimation apparatus according to a second embodiment.

An existent person count estimation apparatus according to a second embodiment will be described with reference to FIGS. 20, 21, and 22. An existent person count estimation apparatus 100 according to the second embodiment is simply illustrated in FIG. 20, but has the same configuration as that of the first embodiment shown in FIG. 1. The second embodiment differs from the first embodiment in that the arrangement of motion sensors is changed.

Figure 21:
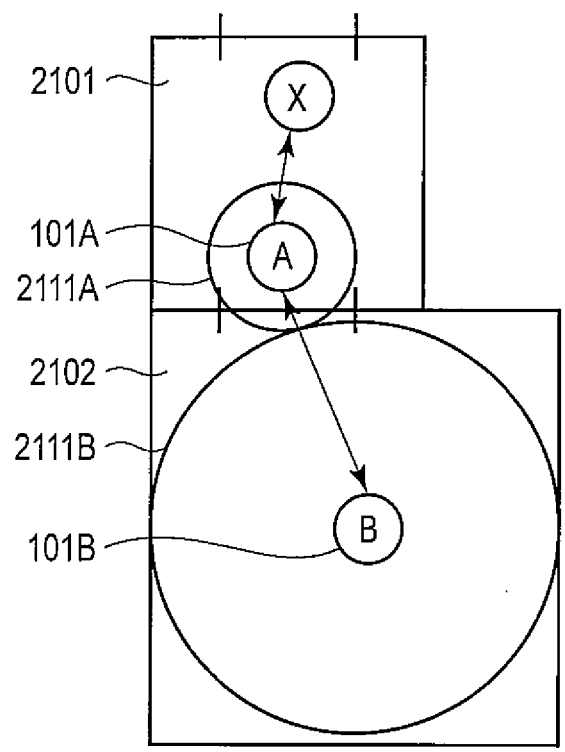
FIG. 21 is an exemplary view showing sensing areas of motion sensors.

FIG. 21 shows examples of sensing areas assigned to motion sensors 101A and 101B according to the second embodiment. Motion sensor 101B is set to have an area 2111B in a room 2102 as a sensing area. Motion sensor 101A is set to have an area 2111A including a room 2101 and a doorway (room A) between rooms 2101 and 2102 as a sensing area. In this arrangement, motion sensor 101A is placed near the doorway between rooms 2101 and 2102. In another example as shown in FIG. 22, motion sensors 101A and 101B are incorporated into an illumination lamp installed on the ceiling of room 2102, motion sensor 101A is set to have the doorway of the room as a sensing area, and motion sensor 101B is set to have the interior of the room as a sensing area. Thus, one or more motion sensors may also be integrated with another apparatus such as an illumination lamp.

As described above, the existent person count estimation apparatus according to the second embodiment can reliably sense the movement of persons between rooms, and can estimate the numbers of persons existing in respective rooms (or areas) more accurately, because the sensing area of a motion sensor is assigned to the doorway.

The existent person count estimation apparatus according to at least one of the above-described embodiments can accurately estimate, for respective areas, the numbers of persons existing indoors, for example, in a house or office. A device such as an illumination lamp, air conditioner, or television can be controlled in accordance with the estimated numbers of existent persons.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An existent person count estimation apparatus comprising:
    a plurality of motion sensors having a plurality of first sensing areas, each of the motion sensors being associated with a different one of the plurality of first sensing areas in which existent person counts are to be estimated, each motion sensor configured to sense presence or absence of a human or a human motion in at least one of the first sensing areas to generate a sensing signal corresponding to the one first sensing area;
    a collection unit configured to collect the sensing signals from the motion sensors to generate human sensing information;
    a storage configured to store first instances and connection relationship information, each of the first instances including estimate values of existent person counts for the first sensing areas at an instantaneous time, the connection relationship information including one or more first connection relationships between the first sensing areas and second connection relationships between the first sensing areas and a second sensing area different from the first sensing areas, and overlap information of the first sensing areas and the second sensing area, wherein one of the first sensing areas and the second sensing area have an overlap area in which both the one first sensing area and the second sensing area sense the same presence or absence of the human or the human motion and thus provide overlap information;
    a transition matrix generation unit configured to calculate first transition probabilities, each of the first transition probabilities indicating a probability that a person moves from one of the first sensing areas to another one of the first sensing areas, and to generate a transition matrix having the first transition probabilities as matrix elements;
    an instance prediction unit configured to predict second instances at present instantaneous time from the first instances in accordance with the first transition probabilities of the transition matrix, and to store, as new first instances, the second instances in the storage;
    a likelihood calculation unit configured to calculate likelihoods of the second instances using prediction from the instance predication unit, the human sensing information and the overlap information;
    an instance selection unit configured to erase at least an instance having a lower likelihood than a predetermined threshold and to select one or more third instances from the second instances, each of the third instances having a likelihood higher than or equal to the predetermined threshold; and
    an output unit configured to calculate a number of identical third instances from the third instances to generate output information, the output information including estimate values of existent person counts for the first sensing areas included in the third instances, in association with the calculated number of the identical third instances.

2. The apparatus according to claim 1, wherein the transition matrix generation unit further calculates second transition probabilities using the connection relationship information, each of the second transition probabilities indicating a probability that a person moves from each of the first sensing areas to the second area, and calculates third probabilities from the first transition probabilities and the second transition probabilities, each of the third probabilities indicating a probability that a person stays in a same first sensing area of the first sensing areas, and the transition matrix has the second probabilities and the third probabilities as the other matrix elements.

3. The apparatus according to claim 1, wherein the likelihood calculation unit calculates first presence-or-absence values of the first sensing areas from the second instances, calculates second presence-or-absence values of the first sensing areas based on the human sensing information, and calculates the likelihoods by using the first presence-or-absence values and the second presence-or-absence values.

4. The apparatus according to claim 1, wherein the output information includes average existent person counts for an average of the first sensing areas, the average existent person counts being obtained by average the third instances.

5. The apparatus according to claim 1, wherein the output information is used for at least one of on-and-off control, operation mode control, and operation level control of a device communicably connected to the apparatus.

* * * * *